Feb. 7, 1928.　　　　　　　　　　　　　　　　1,658,371
H. C. DEGNER
PROCESS OF SHAPING ARTICLES OUT OF STONE
Filed April 27, 1926　　　2 Sheets-Sheet 1
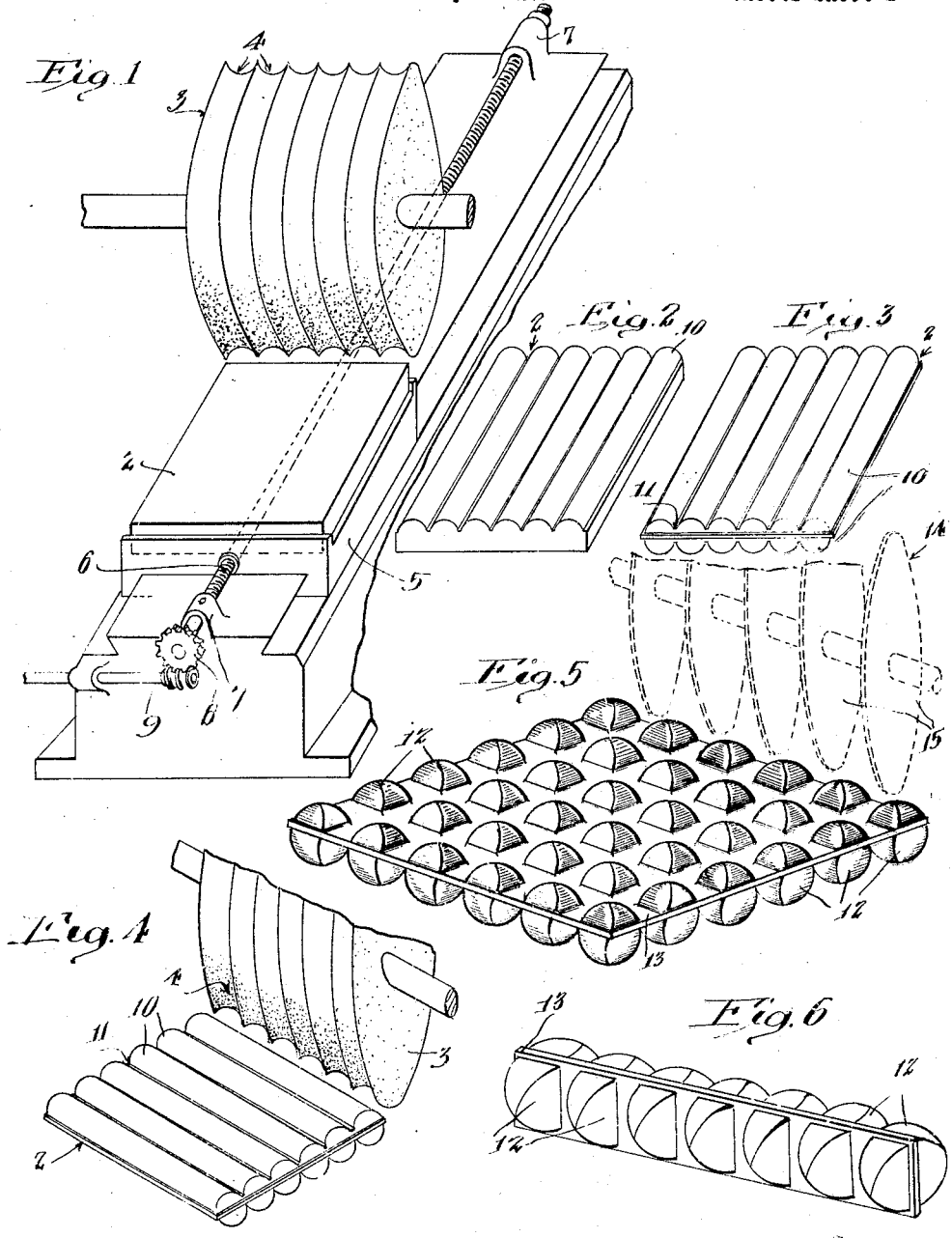
Inventor
Herman C. Degner
By Lyon & Lyon
Attorneys Feb. 7, 1928. 1,658,371
H. C. DEGNER
PROCESS OF SHAPING ARTICLES OUT OF STONE
Filed April 27, 1926 2 Sheets-Sheet 2
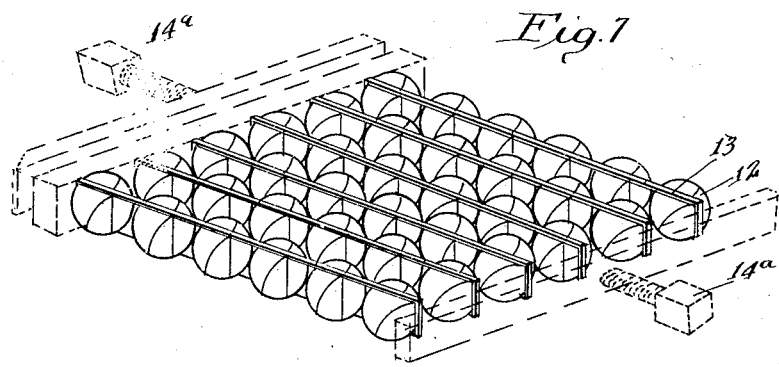
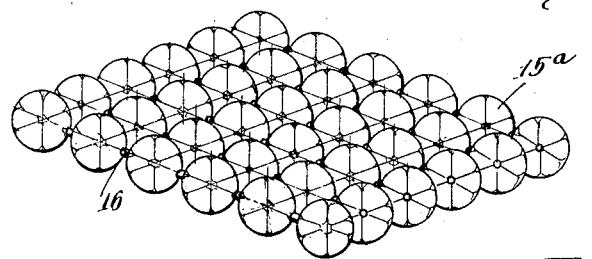
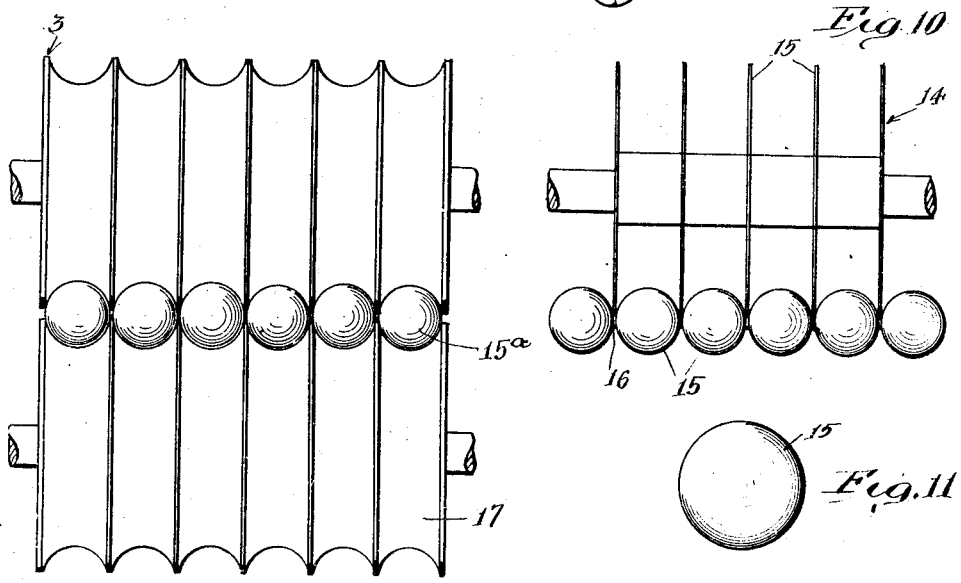
Inventor
Herman C. Degner
By Lyon & Lyon
Attorneys Patented Feb. 7, 1928.

1,658,371

UNITED STATES PATENT OFFICE.

HERMAN C. DEGNER, OF LOS ANGELES, CALIFORNIA.

PROCESS OF SHAPING ARTICLES OUT OF STONE.

Application filed April 27, 1926. Serial No. 104,955.

This invention relates to a process or method of shaping articles out of stone, and refers particularly to a process of producing different articles out of marble.

Heretofore, the shaping of articles out of stone, such as marble, has been an extremely expensive process due to the fact that the articles have had to be separately cut or shaped.

It is an object of the present invention to provide a simple and rapid means by which a plurality of articles may be cut or shaped out of a single rectangular slab of stone or marble to thereby shape the articles at a substantial reduction in cost over that required by the present accepted methods.

The invention and various further objects and advantages thereof will best be understood from a description of a preferred method of shaping articles from stone. For this purpose, I have set forth hereafter a particular example of a process embodying the invention as the process is applied for the production of a plurality of balls from a single slab of stone. It will be readily seen how, by slight variation in the shapes of the different tools employed, various other shaped articles may be formed by the same process.

In the accompanying drawings:

Figure 1 represents diagrammatically a perspective view of an apparatus employed in certain of the shaping steps of the process, Figure 2 is a perspective view of a slab of stone or marble as is obtained from the first step of the process, Fig. 3 is a perspective view of a slab of stone as it is shaped in the second step of the process, Figure 4 is a perspective view illustrating a subsequent or third shaping operation, Figure 5 discloses diagrammatically a subsequent step of the process with the apparatus employed for such step and shows the stone or marble slab in the form it is shaped following the operation illustrated in Figure 4, Figure 6 illustrates part of the product from the operation performed as in Figure 5, Figure 7 illustrates means for holding in position the product from the operation of Figure 5 in order that it may be subjected to a further shaping step, Figure 8 illustrates a product from this shaping operation, Figure 9 diagrammatically indicates the next operation on the material and the means for performing such operation, while Figure 10 indicates the operation of finally separating the shaped articles, Figure 11 illustrates the finished product.

Referring to the drawings, when it is desired to shape articles out of stone, such as marble, the stone or marble is first preferably cut into rectangular slabs 2 of the desired thickness. This slab is then first passed under a cutting or molding wheel 3, which is generally of carborundum, or other like material, and has been shaped to have the semicircular peripheral grooves 4, as illustrated in Figure 1. It is understood that the cutting or molding wheel 3 in this operation is continuously rotated while at the same time, the slab 2 to be shaped is placed upon a carrier 5 by means of which it is passed under the wheel 3. A suitable feeding mechanism is diagrammatically illustrated in Figure 1, wherein the carrier 5 is shown as provided with a worm shaft 6, mounted in bearings 7, 7 and provided with a gear 8 by which it may be driven from a shaft.

As a result of this operation, the slab 2 is shaped into the form illustrated in Figure 2, where the slab is shown having its upper side formed into a plurality of semi-cylinders 10, in number corresponding to the number of the annular semi-circular recesses 4 in the periphery of the cutting or molding wheel 3. After this operation, the slab 2 is then turned over and again placed upon the carrier 5 and re-passed under the revolving molding wheel in order to shape both sides of the slab into semi-cylinders. The result of this operation is to form the slab into the shape shown in Figure 3, in which it consists substantially of a plurality of cylinders held together by a narrow web 11. It is understood that in certain embodiments of the invention, instead of employing a single molding wheel, the slab 2 may be shaped into the form shown in Figure 3 by passing the slab between two justa-positioned molding wheels of the shape of the wheel 3 so as to perform the cutting of both the top and bottom surfaces simultaneously in producing the slab of Figure 3.

Referring now to Figure 4, the slab is shown in Figure 3 is rotated at right angles and again placed upon the carrier 5 and passed under the same molding or cutting wheel 3. Subsequent to this operation, the slab is then turned over and the opposite side presented to the molding wheel 3 in the fashion shown in Figure 4, so that both the top and bottom surfaces of the slab 2 have been passed under the molding wheel in two directions at right angles to each other. This shapes the slab into the form shown in Figure 5. It is understood that the operation in Figure 4 may be performed by passing the slab of Figure 3 between two co-acting molding or cutting wheels in place of under a single wheel and then reversing the slab.

Referring to Figure 5, it will be observed that as a result of the previous operations, both the top and bottom surfaces of the slabs are then formed into mounds 12 formed by semi-circular cuts at right angles to each other, the mounds at the top and bottom of the slab alining and the different mounds are held together by a narrow web or sheet of material 13, which run throughout the center of the slab.

The next operation of the process, as illustrated in Figure 5, comprises passing of the thus formed slab of material through suitable cutting means 14, in order to split the slabs into single rows of mounds 12. For this purpose, the cutter 14 preferably comprises a plurality of disk knives or saws 15 spaced apart in accordance with the space between the mounds 12, so that the entire slab may be cut into strips containing single rows of mounds 12 all in one operation.

As a result of the cutting or sawing operation of Figure 5, the slabs form into the strips illustrated in Figure 6, the strip being indicated as turned at right angles to the position it lay in passing through the process of Figure 5. It will be observed now that the strip comprises a row of mounds 12 at the top and bottom of the strip or at the two sides of the strips as it is positioned in Figure 6, these mounds on opposite sides of the strips being alined so as together generally comprise a row of crude shaped balls separated by the central and narrow rectangular web 13.

These strips of material are shown in Figure 7 as each separately revolved at 90° from their positions as they laid at the time of severance from the main slab and in this position, the strips are clamped together by suitable means, such as indicated at 14ª and again placed upon the carrier 5 so that the strips of material lie parallel to the axis of the cutting or molding wheel 3 and therefore when passed under the cutting or molding wheel 3, the said wheel will cut transversely the top of the strips. The combined mass, as clamped together in Figure 7, is then turned over and the opposite side cut by the cutting or molding wheel 3. The result is that the mass is shaped into the form shown in Figure 8. It is understood that these previously described two operations might be simultaneously performed by the use of two co-acting cutting or molding wheels instead of the single cutting or molding wheel shown in Figure 3.

At this time, the mass of material is formed into a plurality of rows of generally ball-shaped members 15ª which are held together by narrow strings 16 of uncut stone or marble, such as is shown more clearly in Figures 9 and 10. The general ball shaped members 15ª contain a great number of different face cuts and are not ball shaped although approximating this shape. The strips of the generally ball shaped members 15ª are then taken separately and presented to the cutting or molding wheel 3 while at the same time, the strips are themselves rotated as a whole. Figure 9 discloses diagrammatically this step of the operation. In order to provide for the rotation of the strips of the irregular ball members 15ª, they are placed upon a supporting roller 17 which holds the strips adjacent the cutting or molding roller 3 and the roller 17 is revolved as well as the cutting or molding roller in order to spin the strips in the direction of the axis of the strips, thereby removing all of the irregular surfaces of the ball like members and forming the same into substantially true spherical balls separated merely by the narrow strings 16 of uncut stone or marble extending axially through the strips.

These strips of true ball-like members are then presented again to the cutter 14 having the disk knives or saws 15 by which the strings 16 are cut between the different balls 15ª in order to separate the material into individual balls as shown in Figure 11.

Subsequent to this operation, the balls of stone or marble of Figure 11 may be further trued or polished in accordance with any customary or preferred finishing and polishing method.

By the process of the present invention, it will appear that a great number of similarly shaped articles may be formed out of a rectangular slab of stone or marble without the necessity of first cutting the slab into units which must be separately shaped into a separate, finished article. Moreover, the necessity of all lathe work is eliminated.

While the process herein described is well adapted for shaping articles from stone, such as marble, various changes and modifications may be made in the details of the process without departing from the invention. It is further obvious that the process of the present invention may, by slight changes in the process, forms of the cutters or molding wheels employed, be caused to produce a plurality of articles of different shapes than the balls shown, and therefore the invention is not confined to the precise process disclosed for the purpose of illustrating the invention but includes all such changes and modifications as come within the scope of the appended claims.

I claim:

1. In a process of shaping articles from stone, cutting a slab of stone into rows, cutting the rows transversely to form a block of unsevered units, cutting the block into single rows of units, assembling the rows in a different position than they laid before the severing operation, and then subjecting them to a cutting operation while in this position.

2. In a process of shaping articles from stone, cutting the slab of stone into rows, cutting the rows transversely to form a block of unsevered units, severing the block into single rows of units, assembling the rows with units rotated into other than their position before severance, cutting the assembled rows transversely to further remove material, and finally separating and cutting the rows into units.

3. In a process of shaping articles from stone, cutting a slab of stone into rows, cutting the rows transversely to form a block of unsevered units, cutting the block into single rows of units, assembling the rows together with the rows rotated into other than their position before severance, further cutting material from the rows, shaping the rows by rotating the same while cutting the same, and separating the rows into units.

4. In a process of shaping articles from stone, cutting the stone into a plurality of separate rows of partially shaped units, assembling the rows, and cutting the rows transversely while they are assembled, and separating the rows into units.

5. In a process of shaping articles from stone, cutting the stone into rows of partially shaped units, assembling the rows, cutting the assembled mass of rows, rotating the rows while cutting the same, and severing the units of the rows.

6. A process of shaping articles from stone, which comprises cutting a slab of stone to form a slab of partially formed units united by a web, cutting the slab into rows of units, rotating the rows of units while cutting the same, and separating the rows into units.

7. In a process of shaping articles from stone, cutting a slab of stone into rows, cutting the rows transversely to form a block of unsevered units, cutting the block into rows of units, rotating the rows of units while cutting the same, and severing the rows into units.

8. In a process of shaping articles from stone, first cutting the slab of stone to partially form units, then cutting the slab into rows of partially formed units, rotating the rows of units while cutting the same, and separating the rows into units.

9. A process of shaping articles from stone, which comprises cutting a slab of stone to form unfinished units held together by a central web, cutting the slab into rows of units, assembling the rows of units into position other than that before severance, and cutting transversely to the assembled rows to further shape the units.

10. In a process of shaping articles from stone, cutting the stone into rows of unfinished units having a uniting web, cutting transversely to the webs to leave the units united by a string or rod of material, rotating the rows while cutting the same, and severing the rows into units.

11. A process of shaping articles from stone, which comprises first cutting a slab of stone into cylinders united by a central web, then cutting transversely to the cylinder to form unfinished units, still united by the web, cutting the slab into individual rows of said units, rotating the rows and assembling the same so that the relative position of adjacent rows is different than that before they were severed, then cutting transversely to the assembled rows, rotating the rows while further forming the same into the desired shape of units, and separating the units from the rows.

12. A process of shaping articles from stone, which comprises cutting stone into a row of unfinished units united by a center strip of material, and then rotating the row while truing the units.

Signed at Los Angeles, California, this 29 day of March, 1926.

HERMAN C. DEGNER.